United States Patent [19]

Uhrig et al.

[11] Patent Number: 5,008,442
[45] Date of Patent: Apr. 16, 1991

[54] SURFACE-ACTIVE COMPOUNDS ON THE BASIS OF ARYLATED FATTY SUBSTANCES AND THEIR USE

[75] Inventors: Heinz Uhrig, Steinbach/Taunus; Klaus Ehl, Frankfurt am Main; Reinhold Deubel, Bad Soden am Taunus, all of Fed. Rep. of Germany

[73] Assignee: Hoechst Aktiengesellschaft, Frankfurt am Main, Fed. Rep. of Germany

[21] Appl. No.: 854,339

[22] Filed: Apr. 21, 1986

Related U.S. Application Data

[62] Division of Ser. No. 565,906, Dec. 27, 1983, Pat. No. 4,597,906.

[30] Foreign Application Priority Data

Dec. 11, 1979 [DE] Fed. Rep. of Germany ....... 2949694

[51] Int. Cl.$^5$ .............................................. C07C 69/34
[52] U.S. Cl. .................................... 560/149; 560/193
[58] Field of Search ................ 568/607, 608; 560/150, 560/193

[56] References Cited

U.S. PATENT DOCUMENTS 4,091,014 5/1978 Johnson, Jr. et al. .............. 568/608

*Primary Examiner*—Charles F. Warren
*Attorney, Agent, or Firm*—Curtis, Morris & Safford

[57] ABSTRACT

A compound of the formula $$A[(Y-O)_x - Y - Z]_m$$

in which A is the radical of an arylated fatty alcohol, Y are identical or different groups of the formulae $$-CH_2-CH_2- \text{ or } -CH_2-CH(CH_3)-,$$

Z are identical or different radicals of the formulae $-OH$, $-O-CO-CH=CH-COOM$ and $-O-CO-CH_2-CH(SO_3M)-COOM$, in which
M is a cation,
x is an integer from 1 to 150, and
m is a number from 1 to 7.

8 Claims, No Drawings

SURFACE-ACTIVE COMPOUNDS ON THE BASIS OF ARYLATED FATTY SUBSTANCES AND THEIR USE

This application is a division of U.S. application Ser. No. 565,906, filed Dec. 27, 1983, now U.S. Pat. No. 4,597,906, issued July 1, 1986, continuation-in-part of U.S. application Ser. No. 214,755, filed Dec. 9, 1980, now abandoned.

This invention relates to compounds of the formula

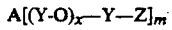

$A[(Y-O)_x-Y-Z]_m$ in which A is the radical of an oxaryl-modified (modified with an aryl group containing a hydroxyl group) fatty alcohol, i.e., the radical of an arylated fatty alcohol, or is the radical of an oxaryl-modified (again, modified with an aryl group containing a hydroxyl group) fatty acid or esterification product thereof, i.e., the radical of an arylated fatty acid or esterification product thereof, Y denotes identical or different groups of the formula

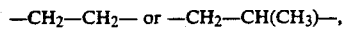

$-CH_2-CH_2-$ or $-CH_2-CH(CH_3)-$,

Z denotes identical or different radicals of the formulae $-OH$, $-O-CO-CH=CH-COOM$ and $-O-CO-CH_2-CH(SO_3M)-COOM$,
in which
  M is a cation,
  x is an integer of from 1 to 150 and
  m is a number of from 1 to 7,
with the exception of the oxalkylation products of difatty acid ester substituted phenolic compounds obtainable by a process which comprises the steps of reacting, at elevated temperature, in the presence of an acidic catalyst, an unsaturated fatty acid ester produced by reacting an unsaturated fatty acid having from 10 and 22 carbon atoms with a saturated alcohol containing from 1 to 8 carbons atoms or a mixture of such esters with 0.2 to 0.8 mol per mole of the unsaturated fatty acid ester, of a phenolic compound of the formula

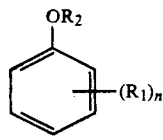

where $R_1$ is an alkyl group containing 1 to 4 carbon atoms or $-OH$, $R_2$ is $-H$, $-CH_3$ or $-CH_2CH_3$, and n is 0, 1 or 2 with the proviso that at least one hydroxy group is present in the phenolic compound and at least two of the ortho- and para-positions on the benzene ring with respect to the $-OR_2$ are unsubstituted, subsequently isolating the product derived from 1 mole of the phenolic compound and 2 moles of the fatty acid ester, and then reacting the product with ethylene oxide or propylene oxide.

The modified, i.e. arylated, fatty alcohol or fatty acid radical A preferably derives from the following compounds:

(a) modified fatty acids and/or mixtures thereof as obtained from unsaturated fatty acids by Friedel-Crafts reaction with aromatic hydroxy compounds (b) esterification products and/or mixtures thereof as obtained by esterification of 1 mol of a mono- to hexahydric, low molecular weight alcohol with 1 to 4 mols, preferably 1 or 2 mols, of a modified fatty acid according to (a) and/or a mixture thereof, (c) esterification products and/or mixtures thereof as obtained by esterification of 1 mol of a low molecular weight alkylol-amine with 1 mol of a modified fatty acid according to (a) and/or a mixture thereof, (d) modified fatty alcohols and/or mixtures thereof as obtained from unsaturated fatty alcohols by Friedel-Crafts reaction with aromatic hydroxy compounds, (e) modified, natural or synthetic fats and/or mixtures thereof as obtained from unsaturated fats and oils, in particular castor oil, by reaction with aromatic hydroxy compounds.

Y is $-CH_2-CH_2-$ or

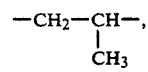

$-CH_2-CH-$,
         |
         $CH_3$

Z is one of the following radicals OH, $-O-SO_3M$ or $-O-OC-CH=CH-COOM$, or $-O-CO-CH_2-CH(SO_3M)$ $-COOM$ x is preferably in the range of from 2 to 20, m is preferably 1 to 3 and M preferably denotes hydrogen, an alkali metal, one molar equivalent of an alkaline earth metal, an ammonium group, in particular an ammonium group derived from a low molecular weight alkylamine or alkylolamine, or an oxalkylate prepared therefrom, for example by addition of 1 to 150 mols, preferably 2 to 25 mols, of ethylene oxide and/or propylene oxide on 1 mol of alkylamine or alkylolamine.

The invention also relates to the use of the aforesaid compounds as interfacially active agents, in particular as dispersing agents for the fine dispersion and stabilization of solids, and as wetting agents, emulsifiers, levelling agents and dyeing auxiliaries.

In the following description the percentages are by weight unless otherwise stated.

The compounds of the invention are obtained by alkylating aromatic hydroxy compounds with unsaturated fatty alcohols or with unsaturnted fatty acids or hydroxyfatty acids or the esterification products of these acids with monohydric alcohols or by alkylating with unsaturated fats and oils and optionally esterifying subsequently the free carboxy group with polyhydric alcohols or alkylolamines. Thereafter, the alkylation products or the mixtures thereof obtained are oxalkylated with ethylene oxide and/or propylene oxide and, if desired, the alkylene oxide addition products are reacted with malein anhydride, it being possible to add optionally alkali metal or alkaline earth metal sulfites or hydrogensulfites on the maleic acid semiesters.

Preferred starting products are:

(a) commercial unsaturated fatty acids or hydroxyfatty acids such as palmitoleic acid, oleic acid, undecylenic acid and ricinoleic acid, fatty acid monoesters (preferably with straight chain monohydric alcohols having up to 6 carbon atoms, in particular up to 4 carbon atoms), such as oleic acid methyl, propyl and butyl esters, ricinoleic acid methyl, propyl and butyl esters, as well as commercial, preponderantly linear, fatty alcohols such as 10-undecenol, 11-dodecenol, 12-tridecenol, 14-pentadecenol, 9-hexadecenol, cis-9-octadecenol, 12-hydroxy-9-octadecenol and/or mixtures thereof, and fats and oils containing unsaturated fatty acids, for example castor oil;

(b) aromatic hydroxy compounds, which are optionally further substituted, for example benzylated, such as phenol, o-, m- or p-cresol, o cresol acetate, guaiacol, phenylmethyl or ethyl ether, α-naphthol and β-naphthol as normally used for arylating olefins, in the presence of strongly acidic or acid-liberating catalysts, for example boron trifluoride, aluminum chloride, p-toluenesulfonic acid, methanesulfonic acid, mineral acids, or ion exchangers, at temperatures of from 50° to 200° C., preferably 120° to 160° C., optionally in an organic medium, using for 1 mol of the aforesaid phenols or naphthols 0.5 to 1.1 mol, preferably 0.9 to 1 mol of unsaturated fatty acids, fatty acid monoesters or fatty alcohols.

Suitable representatives of polyhydric, prefer ably low molecular weight aliphatic alcohols or alkylolamines for the esterification of the alkylated substances having free carboxy groups are, for example, glycerol, polyglycerols, 1,2,4-butanetriol, butanediol-1,4, glycol, polyglycols, 1,1,1-trimethylolethane, 1,1,1-trimethylolpropane, pentaerythritol, 2,4-dihydroxy-3-methylol pentane, hexanetriol, sorbitol, anhydrosorbitol, hexitol, mannitol or mono-, di- and triethanol amine.

The alkylated substances are preferably esterified with the polyhydric alcohols or alkylolamines in a molar proportion of from 1:1 to 4:1, in particular 1:1 to 2:1, at 180° to 300° C., preferably 200° to 270° C., optionally with addition of an entrainer such as an aromatic hydrocarbon or chlorohydrocarbon. Suitable catalysts are, for example, benzenesulfonic acid, p-toluenesulfonic acid, boric acid, tin powder or sulfuric acid.

The alkylated substances or the esterification products thereof are oxalkylated by known methods, preferably with the use of alkali metal hydroxides or alkoxides as catalysts, at 100° to 200° C., preferably 140° to 180° C. Ethylene oxide and/or propylene oxide are used in an amount such that the addition products obtained form stable emulsions or are completely soluble in water. Preferably 1 to 150 and more preferably 2 to 20, in particular 8 to 20 mols of ethylene oxide and/or propylene oxide are added in each free carboxy and hydroxy group of the alkylation products or the esterification products prepared therefrom. The amount of alkylene oxide added depends on the intended use and, thus, on the desired degree of hydrophilic property.

Suitable alkali metal hydroxides are potassium hydroxide and preferably sodium hydroxide, preferred alkali metal alkoxides are sodium methylate and sodium ethylate, the concentration preferably being in the range of from 0.05 to 1.0%, calculated on the alkylated substances or their esterification products at the beginning of oxalkylation. The oxalkylation can be carried out at atmospheric pressure or in autoclaves with propylene oxide, preferably with ethylene oxide or with mixtures thereof, the alkylene oxide being introduced in the form of the gas or liquid The pressure in the autoclave is in the range of from 1 to 10, preferably 2 to 4 bar. If desired, the oxalkylation products are neutralized, for example with acetic acid.

In the following some suitable methods for the introduction of the anionic group(s) are described in detail:

The oxalkylation product is reacted with maleic anhydride to give a maleic acid semiester by mixing the components and stirring at 20° to 100° C., preferably 40° to 80° C., in the presence of 0.1 to 1.0% of alkali metal hydroxide, calculated on the total mixture. Owing to the fact that maleic anhydride tends to sublime, it is advantageous to operate in an autoclave under an excess pressure of 0.2 to 1.0 bar of nitrogen or air while taking care that the mixture is thoroughly mixed since the molten maleic anhydride is poorly miscible with the oxalkylation product at the beginning of the reaction. Maleic anhydride can be used in an amount such that all terminal hydroxy groups of the oxalkylation product or only part thereof, preferably however, at least one, are reacted. To transform the maleic acid semiester compound obtained into the corresponding sulfosuccinic acid semiester aqueous solutions of sulfites or hydrogensulfites are added. For each maleic acid semiester group 1.0 to 1.5, preferably 1.05 to 1.1, molar equivalents of alkali metal or alkaline earth metal sulfite, hydrogensulfite or pyrosulfite are used. The sulfites are especially preferred as they yield the di-salts of the sulfosuccinic acid semiesters. Water can be added in an amount of from 50 to 85%, calculated on the total solution or mixture, the amount depending on the solubility of the sulfosuccinic acid semiester salts and the viscosity of the solution The reaction temperature is in the range of from 20° to 100° C., preferably 40° to 80° C.

It is known to manufacture oil additives and emulsifiers as well as resinous condensation products of unsaturated fatty acids by arylation of unsaturated fatty acids with aromatic hydroxy compounds (cf. J. Am. Oil Chemists Soc. 39, 132 (1962); U.S. Pat. Nos. 3,192,239, 3,479,377 and 3,564,030, German Patent No. 2,161,097 and Japanese Patent Application No. 75-5704).

The use of sulfatized fatty acids or fatty acid esters such as oleic acid, elaidic acid or ricinoleic acid, or the lower alkyl esters thereof, for example, the ethyl, propyl or butyl esters, as dispersing agents and wetting agents is also known from e.g German Offenlegungsschrift No. 2,244,263 and Lindner, "Tenside-Textilhilfmittel-Waschrohstoffe", 635 (1964)).

As anionic dispersing agents sulfatized ethylene oxide addition products are also known (German Offenlegungsschrift No. 2,244,263) for example, sulfatized addition products of 1 to 10 mols of ethylene oxide on fatty acid amides or amines, especially on fatty acids and aliphatic alcohols having from 8 to 20 carbon atoms, such as oleic acid and oleyl alcohol. Reaction products of fatty acids and alkylolamine and addition products of alkylene oxide on fatty acids or esters of polyols and fatty acids having from 12 to 8 carbon atoms are known as well.

The compounds according to the invention and the mixtures thereof are substances having most versatile surface-active properties. In water they yield stable emulsions or clear solutions. They reduce the surface tension determined according to the ring lifting method (Ringabreissmethode, DIN 53 914)) and have a poor foaming power or almost no foaming power (according to the Ross-Miles Method (DIN 53 902)). In addition, they have a good wetting power(dip wetting method for cotton fabric DIN 53 901) and are stable to alkalies and strong acids under the usual conditions of application of surfactants.

The substances according to the invention can be used as emulsifiers and dispersing agents for the most different fields of application. In the first place, they can be used as coupling auxiliaries in the manufacture of azo compounds, in particular azo pigments, as dispersing agents in the manufacture of dispersions of colorants, preferably disperse dyestuffs, for the formulation of pigment preparations, plant protecting agents and pesticides, carrier emulsions and as levelling agents and dyeing auxiliaries. The products are capable of being biologically degraded.

The compounds of the invention can be used either individually, as a mixture or in combination with other non ionic, anionic or cationic compounds, builders and other additives and auxiliaries in formulations of emulsifiers and dispersing agents.

The following examples illustrate the invention.

The following examples A to T describe the manufacture of compounds of the invention. Parts and percentages are by weight and the pressure indications are "excess pressure" unless otherwise stated.

Compounds A (a) Preparation of the fatty acid-$\beta$-naphthol compound 144 parts of $\beta$-naphthol and 282 parts of oleic acid are dissolved in 300 ml of toluene and heated to 120° to 125° C. After addition of 42.9 parts of boron trifluoride ethyl ether complex compound, the mixture is refluxed while stirring for 18 hours under nitrogen at the same temperature. After washing out the catalyst, the reaction mixture is dried with anhydrous sodium sulfate and filtered. Volatile constituents are removed by vacuum distillation or in a rotary evaporator.

Preparation of fatty acid $\beta$-naphthol oxethylation products (b) 4 parts of sodium hydroxide are added to 200 parts of arylated fatty acid according to (a) and the compound is oxethylated with addition of 310 parts of ethylene oxide for 3 hours at 180° to 190° C. under a pressure of 2.2 to 2.6 bar. After having forced in the entire amount of ethylene oxide, stirring of the mixture is continued for 1 hour at 180° to 190° C. The soft, pasty, olive-brown oxethylation product contains 15 mols of ethylene oxide. It forms a clear solution in water. The cloud point in 25% dibutylglycol solution is at 61.0° C.

(c) Under the conditions specified under (b) 200 parts of the arylated fatty acid (a) are oxethylated with 1,408 parts of ethylene oxide for 6 hours. The solid yellow-brown oxethylation product contains 75 mols of ethylene oxide and has a cloud point of 68.5° C. in 10% sodium chloride solution.

(d) Preparation of a monosulfosuccinic acid semiester 6.4 parts of maleic anhydride are added, while stirring, at 40° to 80° C., to 67.0 parts of oxalkylation product (b) and the mixture is stirred for 3 to 3.5 hours at 50° to 80° C. Next, a solution of 8.0 parts of anhydrous sodium sulfite and 122 parts of water is added while stirring over a period of 15 to 120 minutes. When the mixture has become clear, stirring is continued for a further hour at the same temperature. Water can be added in an amount of from 50 to 85% by weight of the final solution.

(e) Preparation of a di-sulfosuccinic acid semiester 50 parts of oxalkylation product (b) are reacted with 9.45 parts of maleic anhydride under the conditions specified under (d) to give the di-semiester, whereupon a solution of 12.18 parts of sodium sulfite and 107.44 parts of water is added.

Compounds B (a) Preparation of the fatty acid-$\beta$-naphthol compound 144 parts of $\beta$-naphthol and 282 parts of oleic acid are refluxed in the presence of 21 parts of a strongly acidic ion exchanger for 36 hours at 150° to 160° C. under nitrogen. Then the ion exchanger is removed by filtration.

Preparation of fatty acid- naphthol oxalkylation products (b) 3 parts of sodium hydroxide are added to 200 parts of arylated fatty acid (a) and the mixture is reacted with 310 parts of ethylene oxide in the same manner as for compound (A/b). The viscous, greenish-brown oxalkylation product obtained contains 15 mols of ethylene oxide and forms a clear solution in water. In 25% butyldiglycol solution it has a cloud point of 64.5° C.

(c) 3 parts of sodium hydroxide are added to 200 parts of arylated fatty acid (a) and the mixture is oxalkylated for about 6 hours with addition of 1,549.2 parts of ethylene oxide in the same manner as for compound (A/c). The waxy, yellow-brown addition product contains 75 mols of ethylene oxide. In 10% sodium chloride solution it has a cloud point of 68.5° C.

(d) Preparation of a di-sulfosuccinic acid semiester

In the same manner as for compound (A/d) 108.6 parts of fatty acid arylation product (b) are esterified with 20.58 parts of maleic anhydride within 3 hours at 40° to 80° C., whereupon a solution of 26.46 parts of anhydrous sodium sulfite in 233.46 parts of water is added at 50° to 80° C. When the solution has become clear, stirring is continued for a further hour.

Compounds C

Preparation of fatty acid-$\beta$-naphthol glycerol ester 200 parts of arylated fatty acid (B/a), 43.3 parts of glycerol and 120 parts of xylene are heated under nitrogen to boil in the presence of 2.6 parts of powdered tin and the reaction water is removed by azeotropic distillation. The reaction is complete after about 8 to 10 hours. Volatile constituents are removed by distillation in vacuo. The glycerol ester obtained as residue is liquid and has an acid number of 8 (according to DIN 53 185).

(b) Preparation of fatty acid-$\beta$-naphthol glycerol ester oxalkylation product 1.05 parts of sodium hydroxide are added to 200 parts of fatty acid-$\beta$-naphthol glycerol ester (a) and the mixture is oxethylated under the usual conditions with 211 parts of ethylene oxide. The viscous, red brown ester oxethylation product contains 12 mols of ethylene oxide and gives a clear solution in water. In 25% butyl diglycol solution it has a cloud point of 52° C.

(c) Preparation of the di-maleic acid semiester

After addition of 1.05 parts of sodium hydroxide, 200 parts of fatty acid-$\beta$-naphthol glycerol ester (a) are reacted with 528 parts of ethylene oxide, whereupon an oxethylation product containing 30 mols of ethylene oxide is obtained. This oxethylation product is esterified with 78.4 parts of maleic anhydride at 40° to 80° C.

Compounds D (a) Preparation of a fatty acid-$\beta$-naphthol pentaerythritol ester In a vessel with stirrer 200 parts of arylated fatty acid (B/a) are esterified for 8 to 10 hours at 140° to 195° C. with 64.0 parts of pentaerythritol and 150 parts of xylene as entrainer, in the presence of 2.6 parts of boric acid, while distilling off the reaction water and simultaneously passing through nitrogen until a product having an acid number of approximately 25 is obtained.

Preparation of fatty acid-$\beta$-naphthol pentaerythritol ester oxethylation products (b) After addition of 1.05 parts of sodium hydroxide, 200 parts of fatty acid-$\beta$-naphthol pentaerythritol ester (a) are reacted with 194 parts of ethylene oxide in the same manner as compound (A/b). The ester addition product obtained is red-brown, contains 12 mols of ethylene oxide, has a waxy consistency and gives a clear solution in water. In 25% butyldiglycol solution it has a cloud point of 61° C.

(c) 200 parts of fatty acid-β-naphthol pentaerythritol ester (a) are reacted as described under (b) with 324 parts of ethylene oxide. The ethylene oxide addition product obtained is viscous, red-brown; it contains 20 mols of ethylene oxide and gives a clear solution in water. In 25% butyldiglycol solution it has a cloud point of 42° C.

Compounds E (a) Preparation of fatty acid-α-naphthol glycerol ester 144 parts of α-naphthol and 282 parts of oleic acid are refluxed under nitrogen for 36 hours at 150° to 160° C. while stirring in the presence of a strongly acidic ion exchanger. Thereafter the ion exchanger is removed by filtration.

(b) Preparation of a fatty acid-α-naphthol glycerol ester 200 parts of arylated fatty acid (a), 43.5 parts of glycerol and 120 parts of xylene are refluxed in the presence of 2.6 parts of powdered tin. The reaction water is removed by azeotropic distillation and collected in a water separator. The reaction is complete after about 8 to 10 hours. Volatile constituents are removed by distillation in vacuo or in a rotary evaporator. A darkbrown, viscous ester having an acid number of about 25 is obtained as residue.

(c) Preparation of the fatty acid α-naphthol glycerol ester oxethylation product 200 parts of fatty acid α-naphthol glycerol ester (b) are admixed with 1.05 parts of sodium hydroxide and then oxethylated with 211 parts of ethylene oxide in the same manner as compound (C/c). The ester addition product obtained is red-brown, it has good flowing properties, it contains 12 mols of ethylene oxide and it is well soluble in water. In 25% butyldiglycol solution it has a cloud point of 49.0° C.

(d) Preparation of the di-sulfosuccinic acid semiester 200 parts of fatty acid α-naphthol glycerol ester addition product (c) are reacted at 40° to 60° C. in the same manner as compound (A/d) with 39.9 parts of maleic anhydride, 51.4 parts of anhydrous sodium sulfite and 437 parts of water.

Compounds F (a) Preparation of fatty acid β-naphthol alkylolamine ester

After addition of 57.2 parts of monoethanolamine and 60 parts of xylene, 400 parts of arylated fatty acid (B/a) are gradually heated to 190° C. with reflux and the reaction water is removed by azeotropic distillation. The reaction is complete after about 8 hours. Volatile constituents are removed by distillation in vacuo. The alkylolamine ester obtained has an acid number of approximately 5.

Preparation of fatty acid β-naphthol alkylolamine oxethylation products (b) After addition of 1.1 parts of sodium hydroxide, 200 parts of fatty acid β-naphthol monoethanolamine ester (a) are oxethylated with 225 parts of ethylene oxide at 160° to 180° C. and stirring of the mixture is continued for 1 hour at 160° to 180° C. The thickly liquid, brown amine oxethylation product contains 12 mols of ethylene oxide and gives a clear solution in water. In 25% butyldiglycol solution it has a cloud point of 82.0° C.

(c) As described under (b) 200 parts of fatty acid β-naphthol alkylamine ester (a) are reacted with 1.407 parts of ethylene oxide. The waxy, beige-brown amineoxethylation product contains 75 mols of ethylene oxide and gives a clear solution in water. In 10% sodium chloride solution it has a cloud point of 70° C.

Compounds G (a) Preparation of fatty acid methyl ester β-naphthol compound 144 parts of β-naphthol and 296 parts of oleic acid methyl ester are refluxed under nitrogen for 36 hours at 150° to 160° C. in the presence of 22 parts of a strongly acidic ion exchanger, while stirring. The ion exchanger is then removed by filtration.

Preparation of fatty acid β-naphthol oxethylation products (b) After addition of 1.1 parts of sodium hydroxide, 200 parts of arylated fatty acid (a) are oxethylated at 160° to 170° C. with 240 parts of ethylene oxide within approximately 3 hours. Stirring of the reaction mixture is continued for 1 hour at the same temperature. The viscous, green-brown oxethylation product contains 12 mols of ethylene oxide and gives a clear solution in water. In 25% butyldiglycol solution it has a cloud point of 52.5° C.

(c) 200 parts of arylated fatty acid ester (a) are reacted with 2,004 parts of ethylene oxide as described under (b). The waxy, light yellow oxethylation product obtained contains 100 mols of ethylene oxide and gives a clear solution in water. In 10% sodium chloride solution it has a cloud point of 65° C.

(d) Preparation of a mono-sulfosuccinic acid semiester 5.3 parts of maleic anhydride are added to 50 parts of arylated fatty acid ester oxethylation product (b) and the mixture is stirred for 3.5 hours at 70° to 80° C. Next, a solution of 6.9 parts of anhydrous sodium sulfite in 93.4 parts of water is added over a period of 15 to 120 minutes while stirring at 70° to 80° C. When the mixture has become clear, stirring is continued for a further hour at the same temperature. The amount of water added can vary between 50 and 85% by weight.

Compounds H (a) Preparation of fatty acid butyl ester-β-naphthol compound 144 parts of β-naphthol and 338 parts of oleic acid butyl ester are refluxed under nitrogen for 36 hours at 150° to 160° C. in the presence of 25 parts of a strongly acidic ion exchanger, while stirring. The ion exchanger is then removed by filtration.

Preparation of fatty acid-β-naphthol oxethylation products (b) After addition of 2.2 parts of sodium ethylate, 200 parts of arylated fatty acid ester (a) are oxethylated like compound (G/b) with 329 parts of ethylene oxide. A water-soluble, non flowable, green-brown (slightly fluorescent) oxethylation product is obtained containing 18 mols of ethylene oxide. In 25% butyldiglycol solution it has a cloud point of 62.0° C.

(c) 200 parts of arylated fatty acid ester (a) are reacted as described under (b) with 2,739 parts of ethylene oxide. The waxy, yellow-green oxethylation product contains 150 mols of ethylene oxide and gives a clear solution in water. In 20% sodium chloride solution it has a cloud point of 52.5° C.

Compounds I (a) Preparation of oleyl alcohol-β-naphthol compound 144 parts of β-naphthol and 268 parts of oleyl alcohol are refluxed under nitrogen for 36 hours at 150° to 160° C. in the presence of 21 parts of a strongly acidic ion exchanger, while stirring. The ion exchanger is then removed by filtration.

Preparation of oleyl alcohol-β-naphthol oxethylation products (b) After addition of 2 parts of sodium hydroxide, 200 parts of arylated fatty alcohol (a) are oxethylated with 320 parts of ethylene oxide over a period of 2 hours at 170° to 180° C. and under a pressure of 2 to 3 bar. The green-brown, pasty oxethylation product contains 15 mols of ethylene oxide and is soluble in water. In 10% sodium chloride solution it has a cloud point of 66.5° C.

(c) After addition of 1.5 parts of sodium hydroxide, 150 parts of arylated fatty alcohol (a) are oxethylated as described under (b) with 2,402 parts of ethylene oxide. The yellow-green oxethylation product is solid and contains 150 mols of ethylene oxide. In 10% sodium chloride solution it has a cloud point of 74° C.

(d) After addition of 1.5 parts of sodium hydroxide, 150 parts of arylated fatty alcohol (a) are oxpropylated for 5.5 hours at 160 to 170° C. under a pressure of 4 bar with 578 parts of propylene oxide. Subsequently, the product is reacted under the same conditions with 2,912 parts of ethylene oxide. The light green, waxy oxalkylation product contains 27.3 mols of propylene oxide and 182 mols of ethylene oxide. In 10% sodium chloride solution it has a cloud point of 71° C.

(e) Preparation of a di-sulfosuccinic acid semiester 50 parts of fatty alcohol-β-naphthol oxethylation product (b) are reacted, as described for product G/d, with 9.6 parts of maleic anhydride and a solution of 12.3 parts of anhydrous sodium sulfite in 93 parts of water. The amount of water added can vary between 50 and 85% by weight of the final solution.

Compounds K (a) Preparation of fatty acid-β-naphthol compound 144 parts of β-naphthol and 298 parts of ricinoleic acid are dissolved in 300 parts of toluene. The mixture is heated to 120° to 125° C., 43.5 parts of boron trifluoride-ethyl ether complex compound are added and the mixture is stirred for 20 hours at 120° to 125° C. The catalyst is washed out, the reaction product is dried with anhydrous sodium sulfate and the toluene is removed by distillation in vacuo.

Preparation of fatty acid-β-naphthol oxethylation products (b) After addition of 2 parts of sodium hydroxide, 200 parts of arylated fatty acid (a) are oxethylated for 2 hours at 180° to 190° C. under a pressure of 2.2 to 2.5 bar with 259 parts of ethylene oxide and the mixture is stirred for 1 hour at the same temperature. The slightly viscous, dark brown oxethylation product contains 13 mols of ethylene oxide and gives in water very slightly opalescent solution, In 25% butyldiglycol solution it has a cloud point of 60° C.

(c) After addition of 2 parts of sodium hydroxide, 200 parts of arylated fatty acid (a) are reacted as described under (b) for 6 hours with 1,493 parts of ethylene oxide. The waxy, yellow-brown oxethylation product contains 75 mols of ethylene oxide. In 10% sodium chloride solution it has a cloud point of 67° C.

(d) Preparation of a di-sulfosuccinic acid semiester 101.4 parts of fatty acid arylation product (b) are esterified with 20.6 parts of maleic anhydride over a period of 3 hours at 70° to 80° C., whereupon 26.5 parts of sodium sulfite (anhydrous), dissolved in 223 parts of water, are added with stirring at 70° to 80° C. When the solution has become clear, stirring is continued for a further hour.

Compounds L (a) Preparation of fatty acid-β-naphthol compound 144 parts of β-naphthol and 298 parts of ricinoleic acid are refluxed under nitrogen for 44 hours at 150° to 160° C. in the presence of 21 parts of a strongly acidic ion exchanger, while stirring. The ion exchanger is then removed by filtration.

(b) Preparation of fatty acid-β-naphthol alkylolamine ester 27.6 parts of monoethanolamine, 2.5 parts of boric acid and 54 parts of xylene are added to 200 parts of arylated fatty acid (a) and the mixture is refluxed, first for 1 hour at 150° C. and then at 170° to 190° C. until the reaction water is removed by azeotropic distillation. The reaction is complete after about 8 hours. Volatile constituents are removed by distillation in vacuo. The alkylolamine ester obtained still has an acid number of approximately 4.

Preparation of fatty acid-β-naphthol alkylolamine oxethylation products (c) After addition of 1.1 parts of sodium hydroxide, 200 parts of arylated fatty acid alkylolamine ester (b) are oxethylated at 160° to 180° C., as described for product (F/b), with 218 parts of ethylene oxide. The viscous ,dark brown amine-oxethylation product contains 12 mols of ethylene oxide and gives a clear solution in water. In 25% butyldiglycol solution it has a cloud point of 94.5° C.

(d) After addition of 1.5 parts of sodium hydroxide, 135 parts of arylated fatty acid alkylolaxmine ester (b) are oxpropylated with 425 parts of propylene oxide for 4.5 hours at 160° to 170° C. and under a pressure of 4 bar. Under the same conditions the reaction product is then reacted further with 2,245 parts of ethylene oxide. The waxy, brown oxalkylation product obtained contains 26.1 mols of propylene oxide and 182 mols of ethylene oxide. In 10% sodium chloride solution is has a cloud point of 69.5° C.

Compounds M (a) Preparation of fatty acid-β-naphthol alkylolamine ester

After addition of 67.4 parts of triethanolamine 2.7 parts of boric acid and 168 parts of xylene, 200 parts of arylated fatty acid (L/a) are refluxed for 1 hour at 150° C. under nitrogen. The mixture is then heated to 170° to 190° C. until the reaction water is removed by distillation. The reaction is complete after about 8-9 hours. Volatile constituents are removed by distillation in vacuo. The alkylolamine ester obtained still has an acid number of about 6.

(b) Preparation of fatty acid-β-naphthol alkylolamine oxethylation product

After addition of 1.1 parts of sodium hydroxide, 200 parts of arylated fatty acid alkylolamine ester (a) are oxethylated according to (L/c) with 184 parts of ethylene oxide for 3 hours at 160° to 170° C. and under a pressure of 2 to 3 bar. The viscous, red-brown alkylolamine addition product contains 12 mols of ethylene oxide and gives a clear solution in water. In 25% butyldiglycol solution is has a cloud point of 78.5° C.

Compounds N (a) Preparation of fatty acid ester β-naphthol compound 144 parts of β-naphthol and 354 parts of ricinoleic acid n-butyl ester are dissolved in 300 parts of toluene and, after addition of 49.8 parts of boron trifluoride ethyl ether complex compound at 120° to 25° C., the mixture is stirred for 6 hours at the same temperature. After removal of the catalyst and drying with anhydrous sodium sulfate, the toluene is eliminated by distillation in vacuo.

Preparation of fatty acid β-naphthol oxethylation products (b) After addition of 2 parts of sodium hydroxide, 200 parts of arylated fatty acid ester (a) are reacted as described for compound (K/b) for 2 hours with 265 parts of ethylene oxide. The waxy, brown oxethylation product contains 15 mols of ethylene oxide and gives a clear solution in water. In 10% butyldiglycol solution it has a cloud point of 46° C.

(c) After addition of 2 parts of sodium hydroxide, 200 parts of arylated fatty acid ester (a) are reacted as described for compound (K/b) with 1,325 parts of ethylene oxide over a period of 5 hours. The waxy, light-yellow oxethylation product contains 75 mols of ethylene oxide. In 10% sodium chloride solution it has a cloud point of 64.5° C.

(d) Preparation of mono-sulfosuccinic acid ester 67 parts of arylated fatty acid ester addition product (b) are esterified for 3 hours at 70° to 80° C. with 5.95 parts of maleic anhydride. A solution of 7.65 parts of anhydrous sodium sulfite in 120.9 parts of water is added at 70° to 80° C.

(e) Preparation of di-sulfosuccinic acid semiester

As described for compound (N/d), 67 parts of arylated fatty acid ester addition product (b) are reacted with 11.9 parts of maleic anhydride and a solution consisting of 15.3 parts of sodium sulfite and 141.3 parts of water.

Compounds O (a) Preparation of fatty acid ester β-naphthol compound 144 parts of β-naphthol and 354 parts of ricinoleic acid n-butyl ester are refluxed under nitrogen for 48 hours at 150° to 160° C. in the presence of a strongly acidic ion exchanger, while stirring. The ion exchanger is then removed by filtration.

(b) Preparation of fatty acid ester β-naphthol oxethylation product

As described for compound (N/c) 200 parts of arylated fatty acid ester (a) are reacted within 6.5 hours with 1,767 parts of ethylene oxide. The waxy, red-brown oxethylation product contains 100 mols of ethylene oxide. In 10% sodium chloride solution it has a cloud point of 67.5° C.

Compounds P (a) Preparation of fatty acid-phenol compound 400 parts of oleic acid and 147 parts of phenol are refluxed under nitrogen for 24 hours at 150° to 160° C. in the presence of 50 parts of a strongly acidic ion exchanger, while stirring. The ion exchanger is then removed by filtration.

(b) Preparation of fatty acid-phenol oxethylation product

After addition of 1 part of sodium hydroxide, 170 parts of arylated fatty acid (a) are oxethylated within 2.5 hours while adding 260 parts of ethylene oxide at 160° to 170° C. under a pressure of 4 bar, whereupon the mixture is stirred for 1 hour at 160° to 170° C. The very viscous, green brown oxethylation product contains 13.4 mols of ethylene oxide and gives a translucenttransparent emulsion in water. In 25% butyldiglycol solution it has a cloud point of 81° C.

(c) Preparation of fatty acid-phenol oxethylation product maleic acid semiester 50 parts of oxethylation product (b) are reacted within 3.5 hours with 10.6 parts of maleic anhydride at 70° to 80° C. and, after addition of 95 parts of water, the reaction product is neutralized with sodium hydroxide solution.

(d) Preparation of di-sulfosuccinic acid semiester

Under the conditions specified under (c) 50 parts of oxethylation product (b) are esterified with 10.6 parts of maleic anhydride, whereupon a solution of 13.7 parts of sodium sulfite (anhydrous) in 112 parts of water is added at 70° to 80° C. When the mixture has become clear, it is stirred for a further hour at the same temperature. The amount of water added can vary between 50 and 85% by weight of the final solution.

Compounds Q (a) Preparation of a fatty acid ester m-cresol compound

As described for compound (P/a), 104 parts of industrial grade m-cresol are reacted with 354 parts of ricinoleic acid n-butyl ester in the presence of 23 parts of a strongly acidic ion exchanger and the mixture is worked up as described above.

Preparation of fatty acid ester m-cresol oxethylation products (b) After addition of 1.0 parts of sodium hydroxide, 200 parts of arylated fatty acid ester (a) are oxethylated over a period of 5 hours at 160° to 170° C. and under a pressure of 3.8 to 4 bar with 384 parts of ethylene oxide. The waxy, beige-brown oxethylation product contains 20 mols of ethylene oxide and gives a clear solution in water. In 25% butyldiglycol solution it has a cloud point of 60° C.

(c) After addition of 1.0 part of sodium hydroxide, 200 parts of arylated fatty acid ester (a) are oxethylated as described under (b) over a period of 8 hours with 1,921 parts of ethylene oxide. The waxy, yellow-brown oxethylation product contains 100 mols of ethylene oxide and in 10% sodium chloride solution it has a cloud point of 64.5° C.

(d) Preparation of a mono-sulfosuccinic acid semiester 75 parts of cresol fatty acid ester oxethylation product (b) and 5.8 parts of maleic anhydride are stirred for 3.5 hours at 70° to 80° C. and the mixture is reacted with a solution of 7.4 parts of sodium sulfite in 132 parts of water at the same temperature. When the concentrate has become clear, stirring is continued for 1 hour.

Compounds R (a) Preparation of benzylated oleic acid-β-naphthol compound 2 parts of aluminum chloride are added at 60° C. to 160 parts of oleic acid-β-naphthol compound (B/a) and the mixture is heated to 100° C. Next, 47.5 parts of benzyl chloride are added dropwise over a period of 1 hour and the mixture is stirred under a nitrogen current for 2 hours at the same temperature. The temperature is then raised to 120° C. and stirring is continued for a further 6 hours. The aluminum chloride is removed at 100° C. by filtration.

(b) Preparation of fatty acid-β-naphthol-benzyl oxethylation product

After addition of 1.5 parts of sodium hydroxide, 170 parts of benzylated fatty acid-β-naphthol compound (a) are oxethylated for 3 hours at 170° to 180° C. under a pressure of 3.2 to 3.8 bar with 261.7 parts of ethylene oxide, whereupon the mixture is stirred for 1 hour at the same temperature. The slightly viscous, green-brown oxethylation product obtained contains 16.8 mols of ethylene oxide and gives a clear solution in water. In 25% butylidiglycol solution it has a cloud point of 57.5° C.

(c) Preparation of mono-sulfosuccinic acid semiester

As described for compound G/d, 50 parts of fatty acid-β-naphtholbenzyl oxethylation product (b) are reacted with 9.5 parts of maleic anhydride and a solution of 12.8 parts of anhydrous sodium sulfite in 109 parts of water. When the reaction mixture has become clear, it is stirred for 1 hour.

Compounds S (a) Preparation of fatty acid ester phenol compound

In the same manner as described for compound (P/a) 94 parts of phenol and 354 parts of ricinoleic acid n-butyl ester are reacted in the presence of 22.5 parts of a strongly acidic ion exchanger and the mixture is worked up as described above.

(b) Preparation of fatty acid ester-phenol-benzyl compound 150 parts of arylated fatty acid ester (a) and 2 parts of aluminum chloride are heated to 100° C. and 44.2 parts of benzyl chloride are added dropwise over a period of 1 hour. The mixture is stirred for 2 hours at 100° C. while passing through nitrogen, the temperature is raised to 120° C. and stirring is continued at the same temperature for 6 hours, whereupon the aluminum chloride is removed by filtration.

(c) Preparation of fatty acid ester-phenol-benzyl oxethylation product

After addition of 1.5 parts of sodium hydroxide, 150 parts of benzylated fatty acid ester-phenol-compound (b) are oxethylated within 8 hours at 190° to 200° C. under 3.8 to 4 bar with 147 parts of ethylene oxide and the mixture is stirred to complete the reaction. The slightly viscous, brown oxethylation product contains 12 mols of ethylene oxide and gives a milky and stable emulsion in water.

Compounds T

Preparation of castor oil-β-naphthol compound 118 parts of β-naphthol and 381 parts of castor oil are refluxed for 48 hours at 150° to 160° C. under nitrogen in the presence of 25 parts of a strongly acidic ion exchanger while stirring. The ion exchanger is then separated by filtration.

(b) Preparation of castor oil-β-naphthol oxethylation product

After addition of 1.0 parts of sodium hydroxide, 200 parts of arylated castor oil (a) are oxethylated over a period of 2 hours at 170° to 180° C. under 4 bar with 259 parts of ethylene oxide. The red-brown, slightly viscous oxethylation product contains 36 mols of ethylene oxide and gives a clear solution in water. In 25% butyldiglycol it has a cloud point of 62° C.

(c) Preparation of di-sulfosuccinic acid semiester 75 parts of castor oil-β-naphthol oxethylation product (b) are reacted with 5.2 parts of maleic anhydride, and thereafter with 6.7 parts of anhydrous sodium sulfite in 125.3 parts of water. The amount of water added can vary between 50 and 80% by weight of the final solution.

(d) Preparation of tri-sulfosuccinic acid semiester 75 parts of castor oil-β-naphthol oxethylation product (b) are reacted with 7.9 parts of maleic anhydride, 10.1 parts of anhydrous sodium sulfite and 134 parts of water.

(e) Preparation of tetra-sulfosuccinic acid semiester 75 parts of castor oil-β-naphthol oxethylation product (b) are reacted with 10.5 parts of maleic anhydride, 13.5 parts of anhydrous sodium sulfite and 141 parts of water.

(f) Preparation of penta-sulfosuccinic acid semiester 75 parts of castor oil-β-naphtho (b) are reacted with 13.1 parts of maleic anhydride, 16.8 parts of anhydrous sodium sulfite and 146.0 parts of water.

Test methods

For testing the dispersing properties of the substances of the invention the following test methods are used:

For comparative milling tests about 4 g of C.I. Disperse Red 65 (C.I. No. 11,228) are milled while cooling according to German Offenlegungsschrift 2,132,403 (U.S. Pat. No. 3,775,056) with the compound to be tested, water and 50 g of siliquartzite beads having a diameter of 1 mm, in a 2 disk stirrer (similar to the usual stirrers in stirring mills) in a small cylinder using a laboratory stirring motor. The increase in fineness is tested at regular intervals by a spreading test on filter paper and by microscopic investigation and the quality of the dispersion is evaluated according to a 5 point scale (1=very poor, 5=very good). To test the storage life the samples are diluted to the desired dyestuff concentration, stored in a drying cabinet at 50° C. and the spreading on filter paper is evaluated, for example, after 1, 3 and 6 weeks.

For testing the dyeing properties a polyester/wool blend is dyed at 106° C. and polyester at 130° C. in known manner. The result is illustrated in the following table by notes 1 to 5 meaning 1=no dying obtained
2=poor
3=useful
4=good
5=very good

TABLE

| Compound | milling time hrs | dispersion quality | storage stability unobjectionable after weeks | polyester/wool dyeing at 106° C. | polyester dyeing at 130° C. |
|---|---|---|---|---|---|
| A/d | 4 | 5 | 6 | 5 | 5 |
| A/e | 4 | 5 | 6 | 5 | 5 |

TABLE-continued

| Compound | milling time hrs | dispersion quality | storage stability unobjectionable after weeks | polyester/wool dyeing at 106° C. | polyester dyeing at 130° C. |
| --- | --- | --- | --- | --- | --- |
| B/d | 4 | 5 | 6 | 5 | 5 |
| E/d | 4 | 5 | 6 | 5 | 5 |
| G/d | 4 | 5 | 6 | 5 | 5 |
| I/e | 4 | 5 | 6 | 5 | 5 |
| K/d | 3 | 5 | 6 | 5 | 5 |
| N/d | 4 | 5 | 6 | 5 | 5 |
| N/e | 5 | 5 | 6 | 5 | 5 |
| P/d | 4 | 5 | 6 | 5 | 5 |
| Q/d | 4 | 5 | 6 | 5 | 5 |
| R/c | 4 | 5 | 6 | 5 | 5 |
| T/e | 4 | 5 | 6 | 5 | 5 |
| T/f | 4 | 5 | 6 | 5 | 5 |

The following examples illustrate the use of substances of the invention as coupling auxiliaries for azo pigments, without constituting any limitation thereto.

EXAMPLE 1

C.I. Pigment Orange 5 (C.I. No. 12075) 11 parts of dinitroaniline are diazotized in a mixture of sulfuric acid and hydrochloric acid with 10.4 parts of 0% sodium nitrite solution.

A solution of 8.64 parts of 100 parts of water and 8 parts of 33% sodium hydroxide solution is added drop by drop to a mixture of 300 parts of water and 10 parts of 31% hydrochloric acid. Coupling to give Pigment Orange 5 is then effected by adding the clarified diazonium salt solution to the suspension of the β-naphthol. The pigment is then filtered, washed with water and dried.

The pigment quality can be influenced by adding surface-active agents to the solution of the β-naphthol and/or to the 31% hydrochloric acid prior to the precipitation of the coupling component.

EXAMPLE 1a

Pigment Orange 5 is coupled as described in Example 1, with the exception that, prior to the dropwise addition of the β-naphthol solution, 1 part of compound (K/d) is added to the mixture of 300 parts of water and 10 parts of 31% hydrochloric acid. As compared with the pigment obtained according to Example 1, the pigment now obtained has a distinctly more yellow shade and a much higher tinctorial strength in letterpress and offset printing and in aqueous preparations for flexographic printing and for use as disperse paints. Printing inks and preparations are distinguished by a low viscosity. Moreover, in letterpress and offset printing the pigment obtained gives prints having a higher gloss and a better transparency.

EXAMPLE 1b

By using, instead of the compound (K/d), compound (B/d), the Pigment Orange 5 obtained has good properties similar to those indicated in Example 1 (a).

EXAMPLE 1c

By using, instead of compound B/d, compound B/b, as auxiliary, the Pigment Orange 5 obtained has a somewhat more reddish shade and exhibits an excellent gloss in letterpress and offset printing.

EXAMPLE 1d

A pigment quality similar to that of Example 1(a) is obtained by replacing the auxiliary of Example 1(a) by compound (N/d).

EXAMPLE 1e

By using in Example 1(d) compound (N/e) instead of the indicated auxiliary, the tinctorial strength of the pigment can be further increased noticeably as compared to Example 1 (d), with the shade being further shifted to yellow.

EXAMPLE 2

C.I. Pigment Yellow 13 (C.I. No. 21100) 25.4 parts of dichlorobenzidine are bis-diazotized in a mixture of 70 parts of 31% hydrochloric acid and ice, with 34.8 parts of 40% sodium nitrite solution. 43.4 parts of N-acetoacetyl-m-xylidide are dissolved in 600 parts of water with addition of 27 parts of 33% sodium hydroxide solution and precipitated by means of 14 parts of glacial acetic acid. Next, the clarified bis-diazonium salt solution is added to the suspension obtained while the pH is maintained at 4.5 by adding dilute sodium hydroxide solution. When coupling is complete, the mixture is heated to 70° C., filtered, washed neutral and the yellow pigment is dried.

The pigment quality can be influenced by adding surface-active substances to the alkaline solution of N-acetoacetyl-m-xylidide prior to the precipitation with glacial acetic acid.

EXAMPLE 2a

Pigment Yellow 13 is coupled as described in Example 2, but 3.5 parts of compound (K/b) are added to the alkaline solution of the coupling component prior to precipitation.

As compared with the pigment of Example 2, the pigment obtained has a higher tinctorial strength and transparency and an improved gloss in letterpress and offset printing.

EXAMPLE 2b

A Pigment Yellow 13 having a good quality similar to that of the pigment described in Example 2(a) is obtained by replacing the auxiliary used in the preceding Example by compound (B/b).

EXAMPLE 3

C.I. Pigment Orange 34 (C.I. No. 21115) In the manner described in Example 2, 25.4 parts of dichlorobenzidine are bis-diazotized. 39.5 parts of p-tolylmethylpyrazolone are dissolved in water with addition of 29 parts of 33% sodium hydroxide solution. Next, the clarified pyrazolone solution is added to the bis-diazonium salt solution. The Pigment Orange 34 is filtered off with suction, washed and dried.

The pigment quality can be improved by adding a substance of the invention to the bis-diazonium salt solution.

EXAMPLE 3a

Coupling is carried out in the manner described in Example 3, but with addition of 3.5 parts of compound (K/d) to the bis-diazonium salt solution. As compared to the pigment of Example 3, the pigment now obtained has a higher tinctorial strength and exhibits an improved gloss in letterpress and offset printing.

What is claimed is:

1. A compound of the formula $$A[(Y-O)_x-Y-Z]_m$$

in which A is the radical of an arylated fatty alcohol, Y are identical or different groups of the formulae $$-CH_2-CH_2- \text{ or } -CH_2-CH(CH_3)-,$$

Z are identical or different radicals of the formulae $-O-CO-CH=CH-COOM$ and $-O-CO-CH_2-CH(SO_3M)-COOM$,
in which M is a cation,
x is an integer from 1 to 150 and
m is a number from 1 to 7.

2. A compound as claimed in claim 1, wherein Y is a radical of the formula $$-CH_2-CH_2-.$$

3. A compound as claimed in claim 1, wherein M is hydrogen, an alkali metal, an alkaline earth metal, ammonium or an ammonium group derived from a low molecular weight alkylamine or alkylolamine, or an oxalkylate prepared therefrom by addition of 1 to 150 mols of ethylene oxide and/or propylene oxide on 1 mol of said alkyl amine or alkylolamine.

4. A compound as claimed in claim 1, wherein x is from 2 to 20.

5. A compound as claimed in claim 1, wherein m is an integer from 1 to 3 and the groups $(Y-O)_x-Y-Z$ are identical or different if m is 2 or 3.

6. A compound claimed in claim 1, wherein A is a Friedel-Crafts reaction product of an aromatic hydroxy compound with an unsaturated fatty alcohol.

7. A compound as claimed in claim 6, wherein A is a Friedel-Crafts reaction product of β-naphthol with oleyl alcohol.

8. A compound as claimed in claim 1, wherein Z is $$-O-CO-CH_2-CH(SO_3M)-COOM$$

in which M is as defined in claim 1.

* * * * *